US012565129B2

(12) United States Patent
Spillner

(10) Patent No.: US 12,565,129 B2
(45) Date of Patent: Mar. 3, 2026

(54) HEATING DEVICE FOR VEHICLE SEATS, AND METHOD FOR OPERATING SAME

(71) Applicant: Gentherm GmbH, Odelzhausen (DE)

(72) Inventor: Rüdiger Spillner, Augsburg (DE)

(73) Assignee: Gentherm GmbH, Odelzhausen (DE)

( * ) Notice: Subject to any disclaimer, the term of this patent is extended or adjusted under 35 U.S.C. 154(b) by 132 days.

(21) Appl. No.: 18/685,623

(22) PCT Filed: Aug. 3, 2022

(86) PCT No.: PCT/DE2022/000087
§ 371 (c)(1),
(2) Date: Feb. 22, 2024

(87) PCT Pub. No.: WO2023/025338
PCT Pub. Date: Mar. 2, 2023

(65) Prior Publication Data
US 2024/0217408 A1     Jul. 4, 2024

(30) Foreign Application Priority Data

Aug. 25, 2021     (DE) ......................... 102021004353.7

(51) Int. Cl.
*B60N 2/56* (2006.01)
*H05B 1/02* (2006.01)
(52) U.S. Cl.
CPC ......... *B60N 2/5678* (2013.01); *H05B 1/0238* (2013.01); *H05B 2203/029* (2013.01)
(58) Field of Classification Search
CPC .. B60N 2/5628; B60N 2/5635; B60N 2/5642; B60N 2/565; B60N 2/5657; A47C 7/74; A47C 7/748
See application file for complete search history.

(56) References Cited

U.S. PATENT DOCUMENTS

2020/0391634 A1   12/2020   Furui et al.
2021/0213856 A1*   7/2021   Fujii ........................ A47C 7/74

FOREIGN PATENT DOCUMENTS

| CN | 114056205 A | * | 2/2022 | ........... B60N 2/0025 |
|---|---|---|---|---|
| DE | 10046216 A1 | | 4/2002 | |
| DE | 102009033654 A1 | | 1/2011 | |
| DE | 102013021593 A1 | | 7/2014 | |

(Continued)

OTHER PUBLICATIONS

International Search Report and Written opinion dated Nov. 3, 2022, for International Application No. PCT/DE2022/000087.

*Primary Examiner* — Joshua J Michener
*Assistant Examiner* — Cindi M Curry
(74) *Attorney, Agent, or Firm* — The Dobrusin Law Firm, P.C.

(57) ABSTRACT

A heating device for a vehicle seat having at least: one first heating element, which is arranged on or close to a first user-facing surface region of the vehicle seat, the structure and operating principle of which is designed for a conductive transfer of heat to a passenger, and a further heating element the operating temperature of which in at least one operating state is greater than the operating temperature of the first heating element and the surface temperature of which generated at a further surface region of the vehicle seat is alternatively or additionally greater than that of the first heating element within the first surface region.

18 Claims, 2 Drawing Sheets

(56)         References Cited

FOREIGN PATENT DOCUMENTS

| | | | | | |
|---|---|---|---|---|---|
| DE | 102019000334 | A1 | 7/2020 | | |
| DE | 112019005055 | T5 | 6/2021 | | |
| JP | H0898896 | A | 4/1996 | | |
| JP | 3208042 | U | 12/2016 | | |
| WO | 2006124835 | A1 | 11/2006 | | |
| WO | WO-2024121812 | A1 * | 6/2024 | .......... | B60N 2/5685 |

\* cited by examiner

HEATING DEVICE FOR VEHICLE SEATS, AND METHOD FOR OPERATING SAME

CROSS-REFERENCE TO RELATED APPLICATIONS

This application is a US National Stage of PCT/DE2022/000087 filed on Aug. 3, 2022, which claims the benefit of DE 10 2021 004 353.7 filed on Aug. 25, 2021, all of which are hereby incorporated by reference herein for all purposes.

FIELD

The invention relates to a heating device for a vehicle seat, a vehicle seat having a heating device, and a method for operating a heating device.

BACKGROUND

Vehicle seats having heating devices are already known from the prior art. Publication JP-H0898896A describes a seat with an IR-heated seatback. Document DE 10 2009 033 654 A1 suggests a headrest with a flat IR heating unit. A heating unit for the shoulder/neck region of vehicle passengers is known from document DE 100 46 216 A1. Publication WO 2006 124835 A1 describes a seat having two independent heating modules, wherein one heating module is arranged in the headrest and one heating module is arranged in the seatback. Document DE 10 2013 021 593 A1 illustrates a heat emitter in a plurality of positions, e.g. in the shoulder region and on a headrest. Publication JP3208042U discloses a plurality of separate heating units within a seatback.

With heating units for vehicle seats, there is the problem that the heated surface regions of a vehicle seat normally interact with the seat user to different extents. For example, some surface regions of a vehicle seat are more strongly loaded with pressure from the weight of the seat user than other surface regions. Further surface regions of the vehicle seat when used typically are positioned spaced apart from the seat user, wherein these surface regions may occasionally come into contact with the seat user in some regions.

The known heating devices do not adequately take into account the above described circumstance, different interaction between the heated surfaces and the seat user, so that frequently the seat user perceives an uneven temperature on the seat surface.

SUMMARY

The underlying object of the invention is to further increase the climate comfort of vehicle seats.

This object is attained using a heating device for a vehicle seat having at least one first heating element which is arranged on or close to a first user-facing surface region of the vehicle seat, and the structure and operating principle of which are designed for a conductive transfer of heat to a passenger. The inventive heating device furthermore comprises a further heating element, the operating temperature of which in at least one operating state is greater than the operating temperature of the first heating element and the surface temperature of which generated at a further surface region of the vehicle seat is alternatively or additionally greater than that of the first heating element within the first surface region.

The first heating element can be arranged in the seatback of the vehicle seat. The further heating element can be arranged, for example, in the seatback of the vehicle seat as well, or in the headrest of the vehicle seat.

It is possible to implement surface heating by individual zone since the operating temperature of the further heating element is greater in at least one operating state than the operating temperature of the first heating element.

The first heating element can be arranged in a lower region of the seatback so that the body weight of the passenger presses the passenger against the first surface region. The further heating element can be arranged in an upper region of the seatback so that the passenger lightly and/or occasionally touches the further surface region, but is not pressed against the further surface region. Furthermore, the further heating element can be arranged such that the passenger does not contact the further surface region or only contacts it slightly. For example, the further surface region is disposed near a gap between the seatback and the headrest.

The first heating element and the further heating element are preferably set up to use heat conduction via the seat cover and clothing of the passenger to provide heat to the body of the passenger.

The heating device can furthermore have one or a plurality of temperature sensors by means of which the temperature of the first heating element and/or of the further heating element can be ascertained. Alternatively or in addition, the heating device comprises one or a plurality of temperature sensors by means of which the temperature in the first surface region and/or in the further surface region can be ascertained. The temperature sensors can be thermistors, for example, in particular positive temperature coefficient thermistors or negative temperature coefficient thermistors, that is, PTC or NTC thermistors.

In one preferred embodiment of the inventive heating device, the further heating element is designed as an infrared heating element. The first heating element is preferably also embodied as an infrared heating element. The first heating element is preferably designed such that the first heating element radiates onto the first surface region. The further heating element is preferably designed such that the further heating element radiates onto the further surface region. One or a plurality of material layers for the vehicle seat, for example one or a plurality of cushion layers and/or a seat cover, can be disposed between the first heating element and the first surface region and/or between the further heating element and the further surface region.

The inventive heating device is further advantageously refined using at least one control system that is set up to control the first heating element and the further heating element for setting a temperature within the first surface region and/or the further surface region and/or for setting a temperature on the first heating element and/or the further heating element. To this end, the control system is preferably connected to temperature sensors via which the temperature of the first heating element and/or of the further heating element and/or the temperature within the first surface region and/or the further surface region is detectable.

Moreover, an inventive heating device is preferred in which the control system is set up to control the first heating element and the further heating element such that the temperature of at least one surface region of the vehicle seat and/or at least one heating element in at least one operating state of the heating device exceeds 50° C. if the surface region of the vehicle seat is not touched by a passenger, wherein the control system is preferably set up to reduce the temperature of the surface region and/or of the heating element as long as the surface region is touched by a passenger. Greater temperatures can be set if the surface region is not touched by the passenger, for example because the passenger has leaned forward or because the passenger has selected a position in which in specific driving situations there is temporarily no surface contact between seat surface and passenger. The heat leaving from the surface region loses intensity by the time it reaches the passenger, so that the temperature can be selected to be greater in the surface region. In addition, the air disposed in the vicinity of the surface region is heated, so that climate comfort is further enhanced.

Moreover, in an inventive heating device it is advantageous when the control system is set up to control the first heating element such that the first surface region and/or the first heating element are heated up to a first heating-up temperature and the first heating-up temperature is held for a first time period in the first surface region and/or on the first heating element. Furthermore, the control system is set up to control the further heating element such that the further surface region and/or the further heating element are heated up to a second heating-up temperature that is greater than the first heating-up temperature, and the second heating-up temperature is held for a second time period in the further surface region and/or on the further heating element. The first time period and the second time period may coincide or may be different from one another. The first time period can also be shorter or longer than the second time period. Different temperatures during a heating-up phase can lead to increased climate comfort due to the positioning of the first heating element and the further heating element or the positioning of the first surface region and the further surface region.

In one further preferred embodiment of the inventive heating device, the control system is set up to control the first heating element such that, after the first time period has passed, the first surface region and/or the first heating element are held at a first continuous operating temperature that is lower than the first heating-up temperature. The control system is furthermore preferably set up to control the further heating element such that, after the second time period has passed, the further surface region and/or the further heating element are held at a second continuous operating temperature that is lower than the second heating-up temperature. The control system thus causes a reduction in temperature after the heating-up phase has concluded. Since the pressure exerted by the passenger on the further surface region is lower than the pressure exerted by the passenger on the first surface region, the second continuous operating temperature can be greater than the first continuous operating temperature, without the passenger perceiving a difference in temperature.

In one further preferred embodiment, the inventive heating device has at least two heating elements and at least one operating state in which the operating temperatures of the two heating elements differ from one another by at least 20° C. An operating temperature difference of at least 20° C. is advantageous, for example, when one of the heating elements or the surface region allocated to this heating element is touched by the passenger during sitting use and one of the heating elements or the surface region allocated to this heating element is not touched by the passenger during sitting use.

The heating device can furthermore comprise touch sensors for ascertaining touching of a surface. The touch sensors can be, for example, pressure sensors or capacitive sensors. The touch sensors can be set up to detect touching of the first heating element and/or of the further heating element and/or touching of the first surface region and/or of the further surface region.

The underlying object of the invention is furthermore attained using a vehicle seat having a heating device, wherein the heating device is embodied according to one of the embodiments described in the foregoing. Refer to the advantages and modifications of the inventive heating device for advantages and modifications of the inventive vehicle seat.

The underlying object of the invention is furthermore attained using a method for operating a heating device, wherein a first heating element and at least one further heating element are supplied with current in at least one operating state and wherein the operating temperature of the first heating element is selected to be at least 5° C. greater than that of the further heating element.

The inventive method is preferably used for operating a heating device according to one of the embodiments described in the foregoing. Refer to the advantages and modifications of the inventive heating device for advantages and modifications of the inventive method.

BRIEF DESCRIPTION OF THE DRAWINGS

Preferred embodiments of the invention are explained and described in greater detail in the following, with reference to the enclosed drawings.

DETAILED DESCRIPTION

Figure 1:
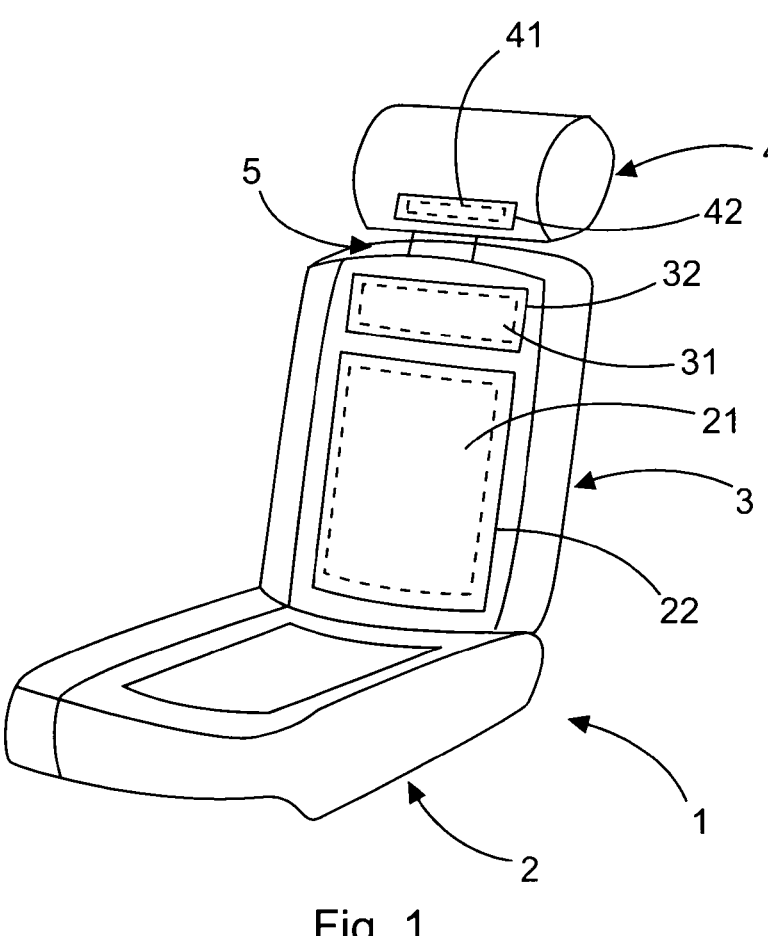
FIG. 1 is a perspective elevation of an inventive vehicle seat having a plurality of heating elements.
Figure 2:
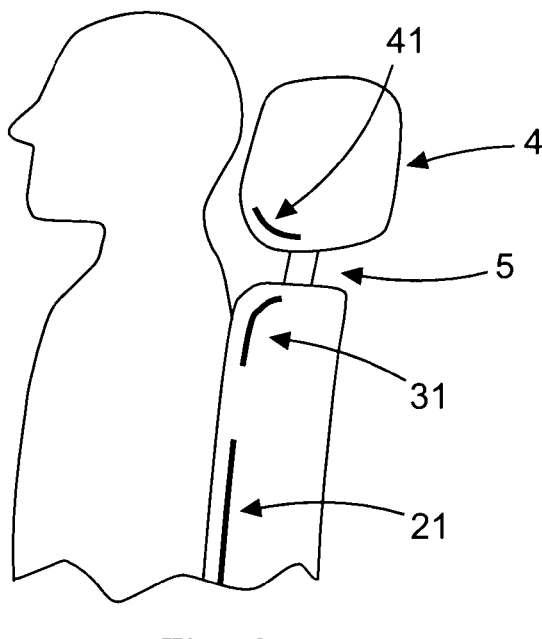
FIG. 2 is a longitudinal section through the upper part of the seat depicted in FIG. 1.

FIGS. 1 and 2 depict a vehicle seat 1. The vehicle seat 1 has a seat cushion 2, a seatback 3, and a headrest 4. The headrest 4 is spaced apart from the seatback 3, a gap 5 remaining. The seatback 3 has at least one first heating element 21, one second heating element 31, and one third heating element 41. The first heating element 21 is arranged at the height of the back of a sitting passenger, preferably at the height of the kidneys. The first heating element 21 is arranged on or near a first user-facing surface region 22 of the seatback 3, preferably immediately under the seat cover. Since in this region the passenger is pressed against the seat and thus the first heating element 21 by his body weight, the first heating element 21 shall be referred to hereinafter as the contact heating element. It is intended to provide heat to the body of the passenger using heat conduction via the seat cover and passenger clothing. Since the human body does not tolerate temperatures greater than 42° C. for long periods, it is important that the temperature within the first surface region 22 of the seatback 3 does not significantly exceed this threshold. Therefore, although it can be provided that the contact heating element 21 has a temperature greater than 42° C. for a limited period in a heating-up phase, e.g. up to 45° C., over the long term the temperature within the first surface region 22 of the seatback 3 is preferably limited to 42° C. Since a certain insulating effect can be caused by the seat cover and other materials that may be disposed between the first surface region 22 of the seatback 3 and the heating element 21, in some circumstances the temperature on the heating element 21 itself is correspondingly greater if this is necessary for compensating the temperature gradient. The contact heating element 21 is preferably designed as an elastic and flexible planar structure integrated into the seat cushion. The contact heating element 21 preferably has a substrate made of textile or film with strand-like heat conductors, e.g. carbon fibers or steel wires.

The second heating element 31 is arranged at the height of the shoulders of a seated passenger. The second heating element 31 is arranged on or near a second user-facing surface region 32 of the seatback 3, preferably immediately under the seat cover. However, since the passenger is not pressed against this region of the seat, and thus against the second heating element 31, but rather this region is only lightly or occasionally touched, the second heating element 31 shall hereinafter be referred to as the light-contact heating element 31. The second heating element 31 is also intended to provide heat to the body of the passenger using heat conduction via seat cover and passenger clothing. Because heat flows are significantly lower than for the contact heating element 21 due to the only light or occasional contact, in this case the continuous surface temperature can be greater than 42° C. Added to this is the fact that small children do not have any contact with the seat at this height, and adults with spinal cord injuries would be able to perceive excessive heat in the shoulder/neck region. In the interests of comfortable heating, therefore, it is safe and desirable to bring the light-contact heating element 31 to a temperature that is greater than that of the contact heating element 21.

During continuous operation, the temperature of the light-contact heating element 31 can therefore be approx. 0° C.-20° C. greater than the temperature of the contact heating element 21, preferably 3° C. to 10° C., preferably 5° C. to 10° C. During continuous operation this temperature difference preferably occurs between the first surface region 22 of the seatback 3 of an unoccupied vehicle seat 1 and the second surface region 32. However, the temperature difference can additionally or alternatively also be measured directly between the two heating elements 21, 31.

The third heating element 41 is positioned at a location that is at least occasionally spaced somewhat apart from the passenger. This can be the lower region of the headrest 4, the gap 5, or at an upper edge of the seatback 3. The third heating element 41 can be arranged on or near a user-facing surface region 42 of the seat. However, it is also possible to sink the third heating element 41 in interior of the seat, in particular the headrest 4 or seatback 3. Since the passenger does not touch, or only infrequently touches, this region of the seat and thus the third heating element 41, this heating element shall hereinafter be referred to as the distance heating element 41.

The third heating element 41 is intended to provide heat to the body of the passenger using heat radiation. The temperature of the distance heating element 41 must be significantly greater than 42° C. due to the lack of contact with the user and for providing adequate heat radiation. During continuous heating operation, the temperature of the third heating element 41 is preferably between 70° C. and 150° C. During continuous operation, the temperature of the distance heating element 41 is therefore approx. 10° C.-30° C. greater than the temperature of the light-contact heating element 31, preferably 10° C. to 20° C., preferably 10° C. to 15° C. This temperature difference preferably occurs between the second surface region 32 and the third surface region 42 of an unoccupied vehicle seat 1 during continuous operation. Additionally or alternatively, however, the temperature difference can also be measured directly between the second and third heating elements 31, 41. During continuous operation, the temperature of the distance heating element 41 is therefore also approx. 20° C.-50° C. greater than the temperature of the contact heating element 21, preferably 20° C. to 30° C., preferably 20° ° C. to 25° C. This temperature difference preferably occurs between the first surface region 22 and the third surface region 42 of an unoccupied vehicle seat 1 during continuous operation. Additionally or alternatively, however, the temperature difference can also be measured directly between the first and third heating elements 21, 41. The distance heating element 41 can likewise be embodied as an elastic and flexible planar structure integrated into the seat cushion. The distance heating element 41 preferably has a substrate made of textile or film with strand-like heat conductors, e.g. carbon fibers or steel wires. In addition, a quick shut-off device is provided that interrupts or reduces the supply of energy to the distance heating element 41 as soon as a certain safety distance between the passenger and the distance heating element 41 is no longer met. In such a case, the distance heating element 41 is then operated like a light-contact heating element 31 or a contact heating element 21.

A light-contact heating element 31 can also be operated like a contact heating element 21 if a certain contact pressure, a certain touching time period, or both are exceeded.

The distance heating element 41 is preferably arranged such that it radiates at least 50% of its output at a height disposed between shoulders and back of the head. In this way a portion of the passenger's body that is not covered by hair or clothing can also be warmed adequately.

The heating device can also have further heating elements that are preferably all operated like one of the aforesaid types as a contact heating element 21, light-contact heating element 31, or distance heating element 41.

In this way it is possible, e.g. to heat the seat side segments even more comfortably than light-contact zones. Even a compensation for asymmetric temperature influences, e.g. due to climate control systems, open sunroofs, sunshine coming in laterally, and open windows could be improved in this way. Dividing the seat surface into right-hand side and left-hand side zones could thus in particular better compensate an elevated requirement for heat on one side due to a locally adjusted control, in particular with the use of distance heating elements 41.

The headrest 4, together with the seatback 3, could also form an integral seat in which the headrest 4 forms a part of the seatback 3.

A light-contact heating element 31 preferably has a greater temperature and/or greater output and/or a greater surface power compared to a contact heating element 21.

Theoretically all of the heating elements 21, 31, 41 could be arranged and operated completely electrically independently of one another. However, it is simpler to operate and control them together. The heating device preferably has at least one control system that controls at least one of the heating elements 21, 31, 41, preferably all of them.

Figure 3:
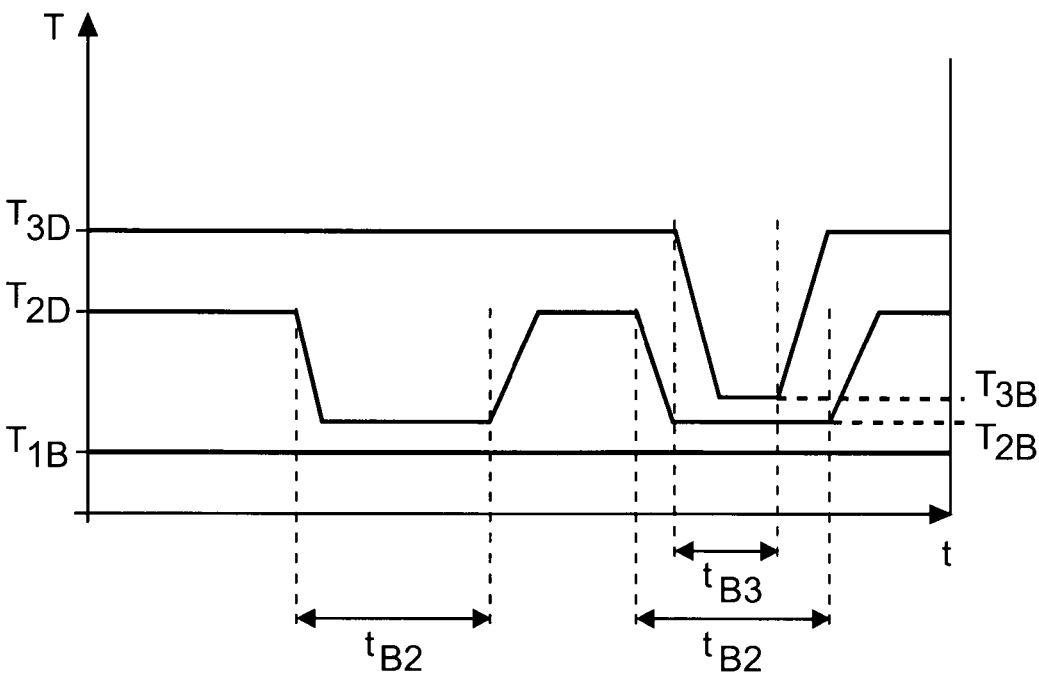
FIG. 3 depicts temperature curves controlled via a control system of an inventive heating device within three surface regions of a vehicle seat; and, FIG. 4 depicts temperature curves controlled via a control system of a further inventive heating device within three surface regions of a vehicle seat.

FIG. 3 depicts temperature curves, controlled by the control system, at surface regions 22, 32, 42 of a vehicle seat 1 that are spaced apart from one another. The surface region 22 is touched continuously by the seat user, so that the control system continuously maintains a temperature $T_{1B}$ in the surface region 22. The surface region 22 is disposed, for example, in the lower region of the seatback 3 of the vehicle seat 1.

The surface region 32 is only touched by the seat user occasionally, specifically during the time periods $t_{B2}$. During these time periods $t_{B2}$, the control system causes a reduction in temperature on the heating element 31 allocated to the surface region 32 to the temperature level $T_{2B}$. Once there is no longer any seat touching in the surface region 32, the control system causes the heating element 31 allocated to the surface region 32 to increase the temperature to the temperature level $T_{2D}$ again. The surface region 32 is disposed, for example, in the upper region of the seatback 3 of the vehicle seat 1.

The surface region 42 is only seldom touched by the seat user, that is, during the time period $t_{B3}$. During this time period $t_{B3}$, the control system causes a reduction in temperature on the heating element 41 allocated to the surface region 42 to the temperature level $T_{3B}$. Once there is no longer any seat touching in the surface region 42, the control system causes the heating element 41 allocated to the surface region 42 to increase the temperature to the temperature level $T_{3D}$ again. The surface region 42 is disposed, for example, on the headrest 4 of the vehicle seat 1 and is oriented towards the region of a gap 5 between seatback 3 and headrest 4.

Figure 4:
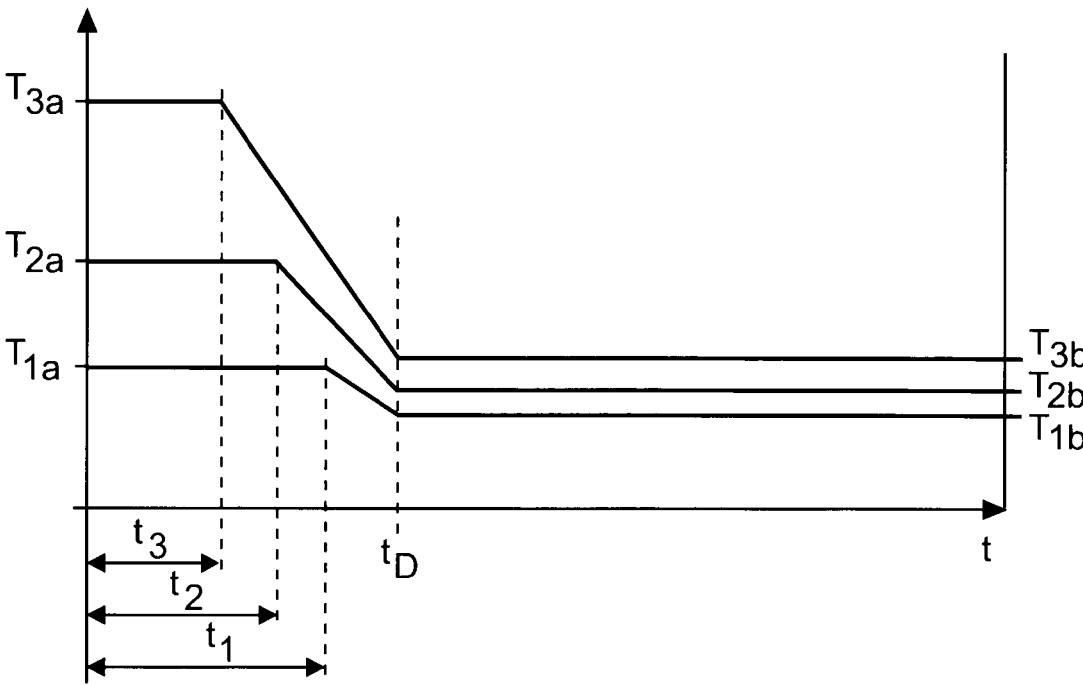

FIG. 4 illustrates that the control system controls the heating elements 21, 31, 41 such that the first surface region 22 is initially heated up via the contact heating element 21 to a heating-up temperature $T_{1a}$ greater than 43° C. The heating up temperature Tia is held for a time $t_1$ before the control system causes the continuous operating temperature $T_{1b}$, at about 43° C., to be set in the surface region 22. Continuous operating temperature $T_{1b}$ is set in the first surface region 22 at time to.

At the same time, in can be provided that surface regions 32, 42 that have less mechanical interaction with the user are heated up via heating elements, specifically via the light-contact heating element 31 and the distance heating element 41, initially to heating-up temperatures $T_{2a}$, $T_{3a}$ greater than the heating-up temperature $T_{1a}$, for example 50° C. or temperatures greater than 50° C., and are held for a briefer time period $t_2$, $t_3$ at this level above the temperature $T_{1a}$ than the time period $t_1$ before the control system causes continuous operating temperatures $T_{2b}$, $T_{3b}$, that are still however greater than 43° C., to be set in the surface regions 32, 42. Continuous operating temperatures $T_{2b}$, $T_{3b}$ are set in the surface regions 32, 42 at time tp.

In the continuous operation mode, the seat surface in the region 22 is heated up to a temperature of $T_{1b}$ of 43° C. The seat surface in the region 32 is heated up to 50° C. in the continuous operation mode. Heating elements 21, 31, 41 that have attained the provided time limit $t_1$, $t_2$, $t_3$ then switch back to a lower temperature.

If the material of the seat cover or parts of its surface have a thermal effusivity of less 350 W/(s*0.5 m*2 K), instead of a temperature of 43° C., a temperature of 55° C. can be selected and maintained for a time period of less than two minutes. Then the temperature is switched back to 43° C. or less.

The temperature difference between the heating elements 21, 31, 41 and the seat surface areas 22, 32, 42 assigned to them in each case depends on the seat structure during the heating phase and/or the continuous operation phase and can be between 5° C. and 30° C.

For this reason, the respective temperature on the seat surface is the preferred factor.

In many cases, the temperature of the seat surface in the region 22 of a contact heating element 21 is at 34° C. to 42°

C., while for a light-contact heating element 31 it is at 43° C. and for a distance heating element 41 it is at 50° C. or 55° C.

To avoid injuries, the temperature of the seat surfaces can be at 42° C. after a certain period for all of the heating elements 21, 31, 41. The time period for this depends on the thermal effusivity of the seat cover.

The temperature of seat surfaces in the region 22 of a contact heating element 21 can be at 34° C. to 42° C. after a certain period in order to prevent overheating.

The temperature of the seat surfaces in the region 32 of a light-contact heating element 31 can remain at 42° C. in order to heat the upper part of the back.

The distance heating element 41 can also be shut off entirely after a certain period in order to prevent overheating of the head.

REFERENCE NUMERAL LIST

1 Vehicle seat
2 Seat cushion
3 Seatback
4 Headrest
5 Gap
21 Heating element
22 Surface region
31 Heating element
32 Surface region
41 Heating element
42 Surface region
$T_{1a}$, $T_{2a}$, $T_{3a}$ Heating-up temperatures
$T_{1b}$, $T_{2b}$, $T_{3b}$ Continuous operating temperatures
$T_{1B}$, $T_{2B}$, $T_{3B}$ Temperatures
$T_{2D}$, $T_{3D}$ Temperatures
$t_{B2}$, $t_{B3}$ Time periods
$t_1$, $t_2$, $t_3$ Time periods
$t_D$ Point in time

The invention claimed is:

1. A heating device for a seat comprising:
a first heating element which is arranged on or close to a first user-facing surface region of the seat, and configured for a conductive transfer of heat, and
a further heating element configured to have:
an operating temperature in at least one operating state that is greater than an operating temperature of the first heating element, and
a surface temperature generated at a further surface region of the seat that is alternatively or additionally greater than the first heating element within the first user-facing surface region,
wherein the further heating element is controlled such that the surface temperature at the further surface region of the seat and/or the further heating element is a predetermined temperature if the further surface region of the seat is not touched by a user, and the further heating element is controlled to reduce the surface temperature at the further surface region of the seat if the further surface region of the seat is touched by the user, wherein the predetermined temperature is or exceeds 50° C.

2. The heating device according to claim 1, wherein the further heating element is embodied as an infrared heating element.

3. The heating device according to claim 1, wherein the first heating element and the further heating element are controlled such that:

the first user-facing surface region and/or the first heating element are heated up to a first heating-up temperature and the first heating-up temperature is held for a first time period in the first user-facing surface region and/or on the first heating element; and the further surface region and/or the further heating element are heated up to a second heating-up temperature that is greater than the first heating-up temperature, and the second heating-up temperature is held for a second time period in the further surface region and/or on the further heating element.

4. The heating device according to claim 3, wherein the first heating element and the further heating element are controlled such that:

after the first time period has passed, the first user-facing surface region and/or the first heating element are held at a first continuous operating temperature that is lower than the first heating-up temperature, and/or after the second time period has passed, the further surface region and/or the further heating element are held at a second continuous operating temperature that is lower than the second heating up temperature.

5. The heating device according to claim 1, wherein the heating device has at least two heating elements and at least one operating state in which the operating temperature of the at least two heating elements differ from one another by at least 20° C.

6. A vehicle seat having the heating device according to claim 1.

7. A method for operating the heating device, according to claim 1, wherein the method comprises supplying the first heating element and the further heating element with current, and in at least one operating state the operating temperature of the first heating element is at least 5° C. greater than that of the further heating element.

8. A heating device for a seat having at least:

a first heating element that is configured to be arranged on or close to a first user-facing surface region of the seat for conductive heat transfer, and a second heating element that is configured to be arranged on or close to a second user-facing surface region of the seat;

wherein the first heating element and the second heating element are controlled so that the second heating element operates at a higher temperature than the first heating element, and wherein when the second user-facing surface region of the seat is touched by a user, a temperature of the second heating element is reduced below a set temperature, and when the second user-facing surface region of the seat is no longer touched by the user, then the temperature of the second heating element is increased to or above the set temperature when the set temperature is or exceeds 50° C.

9. The heating device according to claim 8, wherein the first heating element is located at a lower portion of a seatback of the seat and the second heating element is located at an upper portion of the seatback.

10. The heating device according to claim 9, wherein the heating device comprises a third heating element that is configured to be arranged on or close to a third user-facing surface region of the seat for radiative heat transfer, the third heating element is controlled so that the third heating element operates at a higher temperature than the second heating element.

11. The heating device according to claim 10, wherein when the third user-facing surface region of the seat is touched, a temperature of the third heating element is reduced, and when the third user-facing surface region of the seat is no longer touched, then the temperature of the third heating element is increased.

12. The heating device according to claim 11, wherein the third heating element is located in a region of a head rest of the seat.

13. The heating device according to claim 8, wherein the heating device comprises a third heating element that is configured to be arranged on or close to a third user-facing surface region of the seat for radiative heat transfer, and the third heating element is controlled so that the third heating element operates at a higher temperature than the second heating element.

14. The heating device according to claim 13, wherein when the third user-facing surface region of the seat is touched, a temperature of the third heating element reduced, and when the third user-facing surface region of the seat is no longer touched, then the temperature of the third heating element is increased.

15. The heating device according to claim 13, wherein the first heating element is located at a lower portion of a seatback of the seat, the second heating element is located at an upper portion of the seatback, and the third heating element is located in a region of a head rest of the seat.

16. The heating device according to claim 15, wherein when the third surface region of the seat is touched, a temperature of the third heating element reduced, and when the third user-facing surface region of the seat is no longer touched, then the temperature of the third heating element is increased.

17. The heating device according to claim 8, wherein an operating temperature between the first heating element and the second heating element differs by at least 20° C.

18. The heating device according to claim 8, wherein the heating device comprises one or more touch sensors for ascertaining when the second user-facing surface region of the seat is touched by the user.

* * * * *